May 27, 1930.  R. DRANGEID  1,760,838
ANTISQUEAK STRIP
Filed Feb. 6, 1928
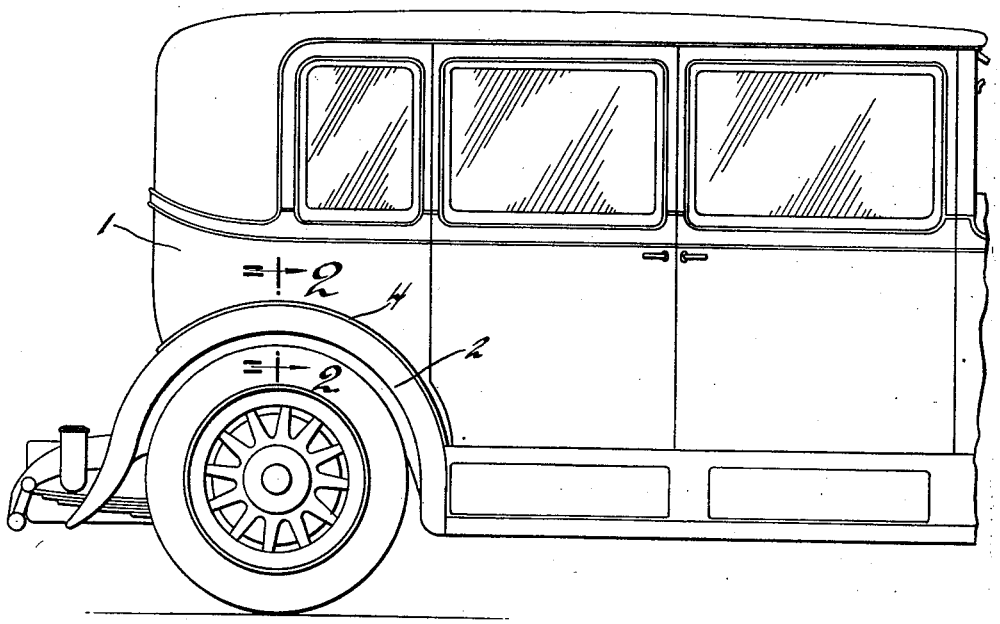
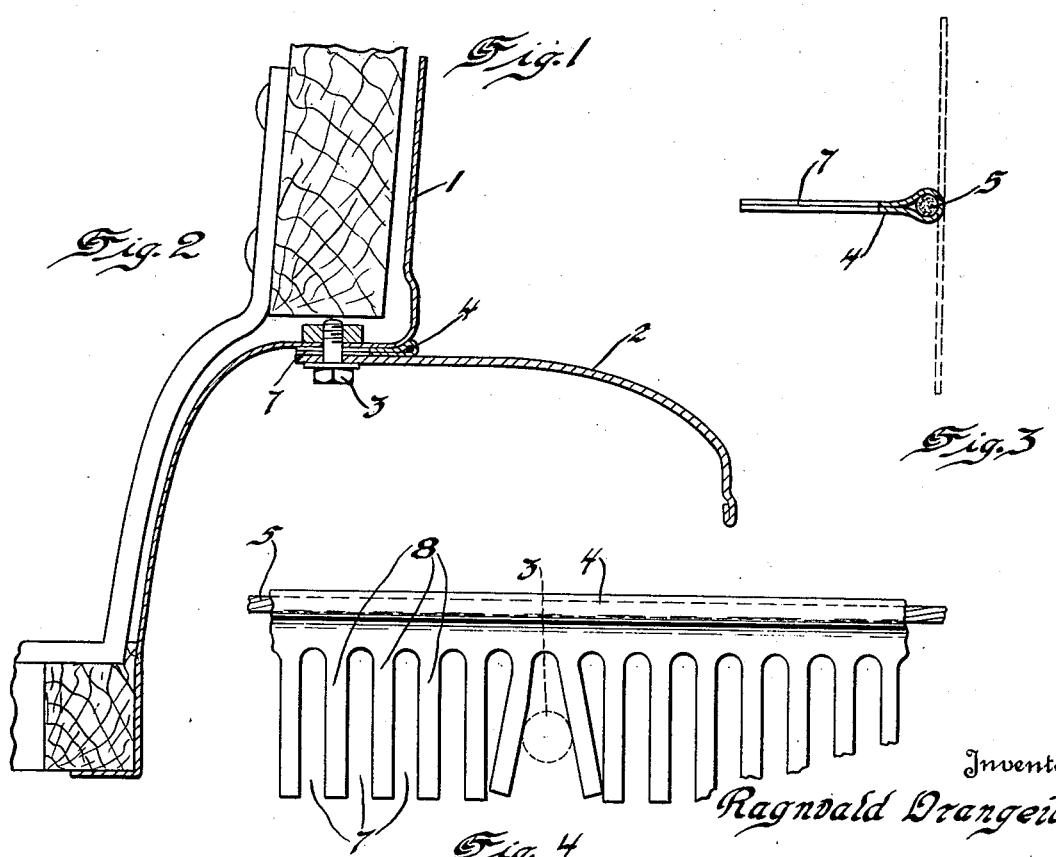
Inventor
Ragnvald Drangeid
By Blackmore, Spencer & Huth
Attorney Patented May 27, 1930

1,760,838

UNITED STATES PATENT OFFICE

RAGNVALD DRANGEID, OF DETROIT, MICHIGAN, ASSIGNOR TO GENERAL MOTORS CORPORATION, OF DETROIT, MICHIGAN, A CORPORATION OF DELAWARE

ANTISQUEAK STRIP

Application filed February 6, 1928. Serial No. 252,277.

This invention relates to anti-squeak webbing or cushioning strips for insertion between two parts to be secured together, for the purpose of eliminating squeaks and noises caused by the rubbing or sliding of one part on the other. Such anti-squeak strips are used to a large extent in automobile construction, where the tendency toward relative movement of joined parts is greatly aggravated, especially during travel of the vehicle over uneven roadways. It has been customary in the past to cut slots in the cushioning strip to allow bending around curves, and to further provide openings at predetermined spaced points to permit the passage therethrough of fastening bolts. Obviously, this procedure necessitates special dies and equipment for each use, and the car manufacturer, particularly one who has a large volume of business on a number of different types of vehicles, must carry several kinds or styles of webbing to take care of his requirements.

To overcome the objections to the conventional webbing heretofore in use, it is proposed to provide a webbing having portions thereof cut away so as to form a series of flexible tongues or tines which may spread apart or bend to accommodate the passage of fastening bolts therethrough to any desired points. Thus one type of anti-squeak strip will serve without modification in any one of the several places or uses to which it may be put, and the difficulty in accurately aligning bolt openings during assembly will not be present. Such strip will also possess sufficient flexibility to allow it to conform to the shape of the parts between which it is placed.

A preferred but not necessarily the only embodiment of the invention is illustrated in the accompanying drawing wherein Figure 1 is a side elevation of a portion of an automobile wherein the anti-squeak strip is employed between the body and the rear fender or splash guard; Figure 2 is a sectional view taken on line 2—2 of Figure 1; Figure 3 is a transverse sectional view of the anti-squeak strip and Figure 4 is a top plan view of a fragment of the strip.

Referring to the drawing the numeral 1, represents a closed automobile body of the sedan type, having the rear fender or splash guard 2 secured thereto by a series of screw threaded bolts or studs 3, and the reference character 4 indicates a strip of cushioning or anti-squeak material, interposed between adjacent portions of the body and fender. In the present case the anti-squeak element comprises a flat strip of fabric, leather or a composition material, which is bent upon itself somewhat after the fashion illustrated in Figure 3, the intermediate portion forming a loop, surrounding a flexible cable or filler strand 5 of fibre or the like, to provide a marginal bead, and the overlapping flat portions being secured to each other as by glue or cement. Portions are cut away from the cemented overlapping portions, inwardly from the edge of the strip opposite the marginal bead, providing a series of openings 7 and transversely extending, longitudinally spaced fingers or tongues 8. When this webbing is inserted between two parts, the flexible fingers 8 will bend or spread apart in either direction, to accommodate the passage of fastening bolts or the like therethrough, regardless of the location of such bolts with respect to the open spaces 7.

I claim:

1. An anti-squeak strip from which portions thereof are cut away from one edge at regular intervals throughout its longitudinal extent leaving a series of longitudinally spaced and transversely extending flexible tongues, which may be spread apart to accommodate the passage of a fastening bolt through the strip at any point in its length.

2. An anti-squeak strip for disposition between abutting members joined together by bolts or the like passing through the members, including a continuous succession of flexible tongues which are movable laterally to accommodate the passage of said fastening element at any point in the strip and between a pair of adjacent tongues.

3. An anti-squeak welt for disposition between abutting members in an automobile construction, which members are jointed together by bolts or the like passing through the members comprising, a length of material having a multiplicity of substantially transversely extending slots which are cut through one edge of the material and which terminate short of the opposite edge of the material to provide a multiplicity of parts which are free at one end and which are independently movable, whereby to permit the passage of a bolt or the like through the welt at any point along its length by displacement of one or more of the parts.

4. An anti-squeak welt for disposition between abutting members in an automobile construction, which members are jointed together by bolts or the like passing through the members comprising, a length of material having a bead portion and a flange portion which is adapted to be disposed between the two members with the bead portion exposed, said flange portion consisting of a multiplicity of independently movable parts whereby bolts or the like may be passed through the flange portion of the welt at any point along its length by displacement of one or more of the parts.

5. An anti-squeak welt for disposition between abutting members in an automoble construction, which members are jointed together by bolts or the like passing through the members, said anti-squeak welt consisting of a length of material having a multiplicity of substantially transversely extending slots which are cut through one edge of the welt, and which terminate short of the opposite edge of the welt, said slots being substantially uniformly arranged to provide a multiplicity of substantially uniform parts which are free at one end and which are independently movable whereby to permit the passage of a bolt or the like through the welt at any point along its length by displacement of one or more parts.

6. For use in connection with automobile constructions and the like having abutting members joined together by bolts or the like, an anti-squeak welt for disposition between such abutting members, said welt comprising a plurality of flexible and independently transversely extending tines spaced apart relative to each other, said flexible tines being designed to permit the passage of a bolt or the like through the welt at any point along its length by displacement of one or more of such tines.

7. An anti-squeak welt for automobile constructions, adapted to be placed between abutting members joined together by bolts or the like passing through the members, said welt comprising a length of material flexible in all directions and having a flange slotted to define a plurality of spaced apart transversely extending tines independently movable with respect to each other whereby to permit the passage of a bolt or the like through the welt at any point along its length by displacement of one or more of such tines.

8. An anti-squeak welt for disposition between abutting members of an automobile construction, which members are joined together by bolts or the like passing through the members, said welt being folded upon itself to provide a laminated flange, said flange portion consisting of a plurality of independently movable spaced apart tines free at their ends whereby to permit the passage of a bolt or the like through the welt at any point along its length by displacement of one or more of such tines.

9. An anti-squeak welt for disposition between the abutting members of an automobile construction, which members are joined together by bolts or the like passing through the members, said welt including a strip of material bent intermediate its ends to provide a laminated flange structure having its laminations adhesively secured together and slotted at a multiplicity of points to provide spaced apart transversely extending tines independently spreadable whereby to permit the passage of a bolt or the like through the welt at any point along its line by displacement of one or more of the tines.

10. An anti-squeak welt for disposition between the abutting members of an automobile construction which members are joined together by bolts or the like passing through the members, said anti-squeak welt consisting of a length of material having a multiplicity of transversely extending slots which are cut through one edge of the welt and which terminate short of the opposite edge of the welt and define spaced tines of substantially uniform character free at one end and which are independently movable whereby to permit the passage of a bolt or the like through the welt at any point along its length by displacement of one or more of such tines.

11. An anti-squeak welt for disposition between the abutting members of an automobile construction, which members are joined together by bolts or the like passing through the members, said anti-squeak welt consisting of a length of material folded intermediate its ends and slotted at a plurality of points to provide transverse spaced apart tines, a flexible filler upon which the strip of material is folded providing a bead, said fingers being of substantially uniform configuration and being independently movable with respect to one another whereby to permit the passage of a bolt or the like through the welt at any point along its length by displacement of one or more of said fingers.

12. An anti-squeak strip for disposition between abutting members joined together by bolts or the like passing through the members, which has throughout its entire extent a continuous succession of regularly spaced flexible tongues, any of which may be displaced laterally to accommodate the passage of bolts.

13. An anti-squeak strip for use between two parts to be joined, including flexible material having portions cut away from one edge at regular intervals throughout its entire extent to provide a continuous succession of spaced flexible tines, which may be flexed laterally to accommodate the passage of a fastening element.

14. An anti-squeak strip to be interposed between two parts to be joined, including a length of flexible material having throughout its length a succession of slits through any one of which the fastening element may be inserted, and wherein the passage of a fastening element through a slot displaces the material of the strip adjacent thereto.

In testimony whereof I affix my signature.

RAGNVALD DRANGEID.